United States Patent
Heideman et al.

(10) Patent No.: US 9,939,582 B2
(45) Date of Patent: Apr. 10, 2018

(54) LAYER HAVING A NON-LINEAR TAPER AND METHOD OF FABRICATION

(71) Applicant: Octrolix BV, Enschede (NL)

(72) Inventors: Rene Gerrit Heideman, Oldenzaal (NL); Marcel Hoekman, Enschede (NL)

(73) Assignee: LioniX International BV, Enschede (NL)

( * ) Notice: Subject to any disclaimer, the term of this patent is extended or adjusted under 35 U.S.C. 154(b) by 10 days.

(21) Appl. No.: 15/004,037

(22) Filed: Jan. 22, 2016

(65) Prior Publication Data

US 2016/0246003 A1    Aug. 25, 2016

Related U.S. Application Data

(60) Division of application No. 14/270,014, filed on May 5, 2014, now Pat. No. 9,268,089, which is a
(Continued)

(51) Int. Cl.
*G02B 6/14* (2006.01)
*G02B 6/122* (2006.01)
(Continued)

(52) U.S. Cl.
CPC ............ *G02B 6/14* (2013.01); *G02B 6/1223* (2013.01); *G02B 6/1228* (2013.01); *G02B 6/136* (2013.01);
(Continued)

(58) Field of Classification Search
CPC ...... G02B 6/14; G02B 6/1223; G02B 6/1228; G02B 6/136; G02B 2006/12173;
(Continued)

(56) References Cited

U.S. PATENT DOCUMENTS 4,380,861 A * 4/1983 Sugino .................. H01S 5/2238
                                                                438/41
4,865,407 A * 9/1989 Suzuki ................. G02B 6/1228
                                                                385/129
(Continued)

FOREIGN PATENT DOCUMENTS

EP    0546961 A1    11/1992
EP    2720073 A2    10/2013
(Continued)

OTHER PUBLICATIONS

U.S. Appl. No. 13/451,957, "Notice of Allowability", dated Dec. 26, 2013, Publisher: USPTO, Published in: US.
(Continued)

*Primary Examiner* — Peter Radkowski
(74) *Attorney, Agent, or Firm* — Kaplan Breyer Schwarz, LLP

(57) ABSTRACT

A method for forming a non-linear thickness-profile in a first layer of a first material is disclosed. The method comprises forming an accelerator layer of a second material on the first layer and forming a mask layer disposed on the accelerator layer, wherein the mask layer enables the accelerator layer to expose the first layer to a first etchant in a first region, where the exposure time for each point along a first axis varies non-linearly as a function of distance from a first point on the first axis. Since the time for which the first layer is exposed to the first etch in the first region is non-linear, the thickness of the first layer in the first region changes non-linearly along the first axis.

15 Claims, 14 Drawing Sheets

Related U.S. Application Data continuation-in-part of application No. 13/451,957, filed on Apr. 20, 2012, now Pat. No. 8,718,432.

(60) Provisional application No. 61/477,960, filed on Apr. 21, 2011.

(51) Int. Cl.
*G02B 6/136* (2006.01)
*G02B 6/12* (2006.01)

(52) U.S. Cl.
CPC .............. *G02B 2006/12173* (2013.01); *G02B 2006/12176* (2013.01); *G02B 2006/12195* (2013.01); *Y10T 428/24479* (2015.01)

(58) Field of Classification Search
CPC ........... G02B 2006/12176; G02B 2006/12195; Y10T 428/24479
See application file for complete search history.

(56) References Cited

U.S. PATENT DOCUMENTS

| | | | |
|---|---|---|---|
| 5,208,882 A * | 5/1993 | Strasser ................... | G02B 6/34 385/130 |
| 5,652,554 A | 7/1997 | Krieg et al. | |
| 5,854,868 A * | 12/1998 | Yoshimura ............. | B82Y 20/00 385/14 |
| 6,052,397 A | 4/2000 | Jeon et al. | |
| 6,174,748 B1 | 1/2001 | Jeon et al. | |
| 6,219,366 B1 * | 4/2001 | Furushima ................. | H01S 5/10 372/45.01 |
| 6,396,984 B1 * | 5/2002 | Cho ...................... | G02B 6/1228 385/28 |
| 6,465,269 B2 * | 10/2002 | Furushima ................ | H01S 5/10 438/31 |
| 6,574,259 B1 * | 6/2003 | Fish ................... | H01S 5/06256 372/50.1 |
| 6,681,069 B2 * | 1/2004 | Galarza ................ | G02B 6/1228 385/129 |
| 6,760,529 B2 * | 7/2004 | Chong ................. | G02B 6/1228 385/129 |
| 6,767,756 B2 * | 7/2004 | Lee ........................ | G02B 6/136 385/129 |
| 6,778,737 B2 * | 8/2004 | Shimoda .............. | G02B 6/1228 385/129 |
| 6,809,019 B2 | 10/2004 | Hartner et al. | |
| 6,813,432 B2 * | 11/2004 | Salib ...................... | G02B 6/136 372/45.01 |
| 6,823,111 B2 | 11/2004 | Jette et al. | |
| 6,862,300 B1 | 3/2005 | Traut et al. | |
| 6,937,779 B2 | 8/2005 | Oguro | |
| 6,977,622 B2 | 12/2005 | Hay et al. | |
| 7,050,681 B2 * | 5/2006 | Blauvelt .............. | G02B 6/12002 385/28 |
| 7,079,727 B1 * | 7/2006 | Little ..................... | G02B 6/132 385/130 |
| 7,099,540 B2 * | 8/2006 | Shimoda .............. | G02B 6/1228 385/49 |
| 7,146,087 B2 | 12/2006 | Heideman et al. | |
| 7,158,701 B2 * | 1/2007 | Dautartas .............. | G02B 6/1228 385/129 |
| 7,158,702 B2 * | 1/2007 | Blauvelt .............. | G02B 6/12002 385/28 |
| 7,164,825 B2 * | 1/2007 | Blauvelt .............. | G02B 6/12002 385/28 |
| 7,183,877 B2 | 2/2007 | Juenemann et al. | |
| 7,190,852 B2 * | 3/2007 | Heim ................. | G02B 6/12004 385/14 |
| 7,218,809 B2 * | 5/2007 | Zhou ..................... | G02B 6/1228 385/28 |
| 7,310,466 B2 | 12/2007 | Fink et al. | |
| 7,366,421 B2 * | 4/2008 | Cho ....................... | G02B 6/14 398/142 |
| 7,479,236 B2 | 1/2009 | Chen et al. | |
| 7,486,878 B2 | 2/2009 | Chen et al. | |
| 7,577,327 B2 * | 8/2009 | Blauvelt ............. | G02B 6/12002 385/129 |
| 7,783,146 B2 * | 8/2010 | Blauvelt ............. | G02B 6/12002 385/30 |
| 7,853,103 B2 * | 12/2010 | Blauvelt ............. | G02B 6/12002 349/187 |
| 7,885,499 B2 * | 2/2011 | Blauvelt ............. | G02B 6/12002 385/30 |
| 8,126,301 B2 * | 2/2012 | Ishizaka ............... | G02B 6/1228 216/51 |
| 8,135,485 B2 | 3/2012 | Chen et al. | |
| 8,238,704 B2 * | 8/2012 | Ben Bakir ........... | G02B 6/1228 216/24 |
| 8,320,721 B2 * | 11/2012 | Cevini ................... | G02B 6/305 385/131 |
| 8,705,925 B2 | 4/2014 | Terada et al. | |
| 8,718,432 B1 | 5/2014 | Heideman et al. | |
| 2001/0010701 A1 * | 8/2001 | Furushima ................. | H01S 5/10 438/29 |
| 2002/0105989 A1 * | 8/2002 | Matsuyama ............ | H01S 5/227 372/46.01 |
| 2002/0146205 A1 * | 10/2002 | Shimoda .............. | G02B 6/1228 385/43 |
| 2002/0191916 A1 * | 12/2002 | Frish ..................... | G02B 6/1228 385/43 |
| 2003/0002793 A1 * | 1/2003 | Dautartas .............. | G02B 6/1228 385/37 |
| 2003/0007766 A1 * | 1/2003 | Galarza ................ | G02B 6/1228 385/132 |
| 2003/0044118 A1 * | 3/2003 | Zhou ..................... | G02B 6/1228 385/43 |
| 2003/0108319 A1 * | 6/2003 | Chong ................. | G02B 6/1228 385/129 |
| 2003/0111439 A1 * | 6/2003 | Fetter ..................... | H01L 41/29 216/13 |
| 2003/0138216 A1 * | 7/2003 | Shimoda .............. | G02B 6/1228 385/50 |
| 2003/0174956 A1 * | 9/2003 | Viens ................... | G02B 6/1228 385/43 |
| 2003/0223719 A1 * | 12/2003 | Salib ...................... | G02B 6/136 385/129 |
| 2004/0005118 A1 * | 1/2004 | Lee ........................ | G02B 6/136 385/43 |
| 2004/0037497 A1 * | 2/2004 | Lee ........................ | G02B 6/132 385/28 |
| 2004/0071384 A1 * | 4/2004 | Heim ................. | G02B 6/12004 385/14 |
| 2004/0081398 A1 | 4/2004 | Jette et al. | |
| 2004/0096174 A1 * | 5/2004 | Tankala ............... | G02B 6/2552 385/125 |
| 2004/0108961 A1 | 6/2004 | Hay et al. | |
| 2004/0114869 A1 * | 6/2004 | Fike ...................... | G02B 6/124 385/43 |
| 2004/0233014 A1 | 11/2004 | Juenemann et al. | |
| 2005/0098855 A1 * | 5/2005 | Shimoji ............... | B81C 1/00626 257/621 |
| 2005/0113889 A1 * | 5/2005 | Jimenez ............... | A61N 1/3787 607/61 |
| 2005/0141899 A1 * | 6/2005 | Cho ....................... | G02B 6/14 398/182 |
| 2005/0152660 A1 | 7/2005 | Heideman et al. | |
| 2005/0179508 A1 | 8/2005 | Sato | |
| 2005/0213889 A1 * | 9/2005 | Blauvelt .............. | G02B 6/12002 385/50 |
| 2005/0226579 A1 | 10/2005 | Fink et al. | |
| 2006/0062521 A1 * | 3/2006 | Zhou ..................... | G02B 6/1228 385/43 |
| 2007/0020934 A1 | 1/2007 | Gaidis et al. | |
| 2007/0037307 A1 | 2/2007 | Donofrio | |
| 2007/0041703 A1 | 2/2007 | Wang | |

(56) References Cited

U.S. PATENT DOCUMENTS

| | | | |
|---|---|---|---|
| 2008/0044126 A1* | 2/2008 | Costa | G02B 6/1228 385/14 |
| 2008/0080845 A1 | 4/2008 | Chen et al. | |
| 2008/0081383 A1 | 4/2008 | Chen et al. | |
| 2008/0193080 A1* | 8/2008 | Cheben | G02B 6/1228 385/28 |
| 2008/0264107 A1* | 10/2008 | Malinovich | C03C 21/005 65/425 |
| 2008/0303042 A1 | 12/2008 | Minato et al. | |
| 2009/0088887 A1 | 4/2009 | Chen et al. | |
| 2009/0245728 A1* | 10/2009 | Cherchi | G02B 6/14 385/28 |
| 2009/0252456 A1* | 10/2009 | Rasras | G02B 6/305 385/43 |
| 2010/0086255 A1* | 4/2010 | Ishizaka | G02B 6/1228 385/31 |
| 2010/0086256 A1* | 4/2010 | Ben Bakir | G02B 6/1228 385/49 |
| 2011/0110623 A1 | 5/2011 | Terada et al. | |
| 2011/0116741 A1* | 5/2011 | Cevini | G02B 6/305 385/28 |
| 2011/0182549 A1* | 7/2011 | Okayama | G02B 6/305 385/43 |
| 2013/0170793 A1* | 7/2013 | Ushida | G02B 6/1228 385/43 |

FOREIGN PATENT DOCUMENTS

| | | | | |
|---|---|---|---|---|
| JP | 0560928 A | | 3/1993 | |
| JP | 3112115 B2 | | 11/2000 | |
| JP | 2011123094 A | * | 6/2011 | |
| WO | 2002005000 A2 | | 1/2002 | |
| WO | WO 02097489 A2 | * | 12/2002 | G02B 6/1228 |
| WO | WO 02097489 A3 | * | 11/2003 | G02B 6/1228 |
| WO | 2009051562 A1 | | 4/2009 | |
| WO | WO 2009051562 A1 | * | 4/2009 | G02B 6/1228 |
| WO | 2009106140 A1 | | 9/2009 | |

OTHER PUBLICATIONS

U.S. Appl. No. 13/451,957, "Office Action—Restriction Requirement", dated May 16, 2013, Publisher: USPTO, Published in: US.

U.S. Appl. No. 13/451,957, "Office Action", dated Aug. 19, 2013, Publisher: USPTO, Published in: US.

U.S. Appl. No. 14/270,014 "Office Action—Restriction", dated Feb. 5, 2015, Published in: US.

T. Brenner and H. Melchior, "Local Etch-Rate Control of Masked InP/InGaAsP by Diffusion-Limited Etching", "J. Electrochem. Soc.", Jul. 1994, pp. 1954-1956, vol. 141, No. 7, Publisher: The Electrochemical Society, Published in: US.

Jeong et al., "Low-Loss Compact Arrayed Waveguide Grating with Spot-Size Converter Fabricated by a Shadow-Mask Etching Technique", "ETRI Journal", Feb. 2005, pp. 89-94, vol. 27, No. 1, Publisher: Electronics and Telecommunications Research Institute (ETRI), Published in: KR.

Dong et al., "Low loss shallow-ridge silicon waveguides", "Optics Express", Jul. 5, 2010, pp. 14474-14479, vol. 18, No. 14, Publisher: Optical Society of America.

Mizuno et al., "Optical Spotsize Converter Using Narrow Laterally Tapered Waveguide for Planar Lightwave Circuits", "Journal of Lightwave Technology", 2004, p. 833 vol. 22, No. 3, Publisher: IEE.

Notomi et al., "Photonic Crystals: Towards Utrasmall Lightwave Circuits", "NTT Technical Review", Feb. 2004, vol. 2, No. 2, Publisher: Nippon Telegraph and Telephone.

Tsuchizawa et al., "Spot-size converters for rib-type silicon photonic wire waveguides", "2008 5th IEEE International Conference on Goup IV Photonics IEEE Xplore Digital Library", Sep. 17-19, 2008, Publisher: IEEE.

Li et al., "Monolithically integrated low-loss three-dimensional spot-size converter and silicon photonic waveguides constructed by", "Journal of Micro/Nanolithography, MEMS and MOEMS", Apr. 13, 2011, vol. 10, No. 2, Publisher: Society of Photo-Optical Instrumentation Engineers (SPIE) Digital Library.

Shinya et al., "Spot-size Converter of Photonic Crystal Waveguide", "http://www.brl.ntt.co.jp/E/activities/file/report02/E/report20.html".

"European Search Report", dated Oct. 8, 2015, issued in counterpart European Patent Application No. 14175029.9.

Examination Report, dated Feb. 4, 2016, issued in counterpart European Patent Application No. 12180268.0.

"Office Action" issued in co-pending European patent application No. 14175029.9, dated Mar. 8, 2017, Published in: EP.

* cited by examiner

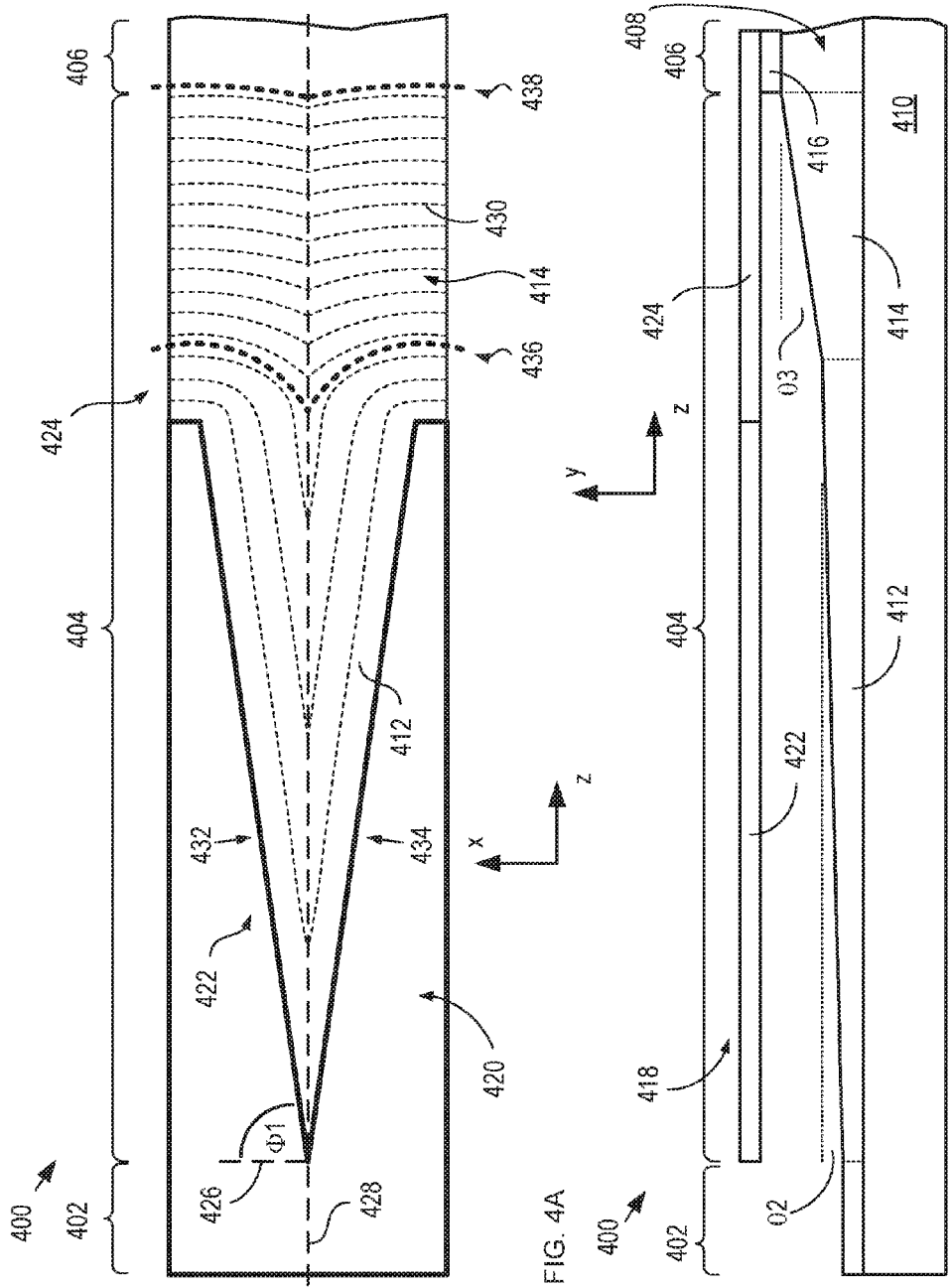

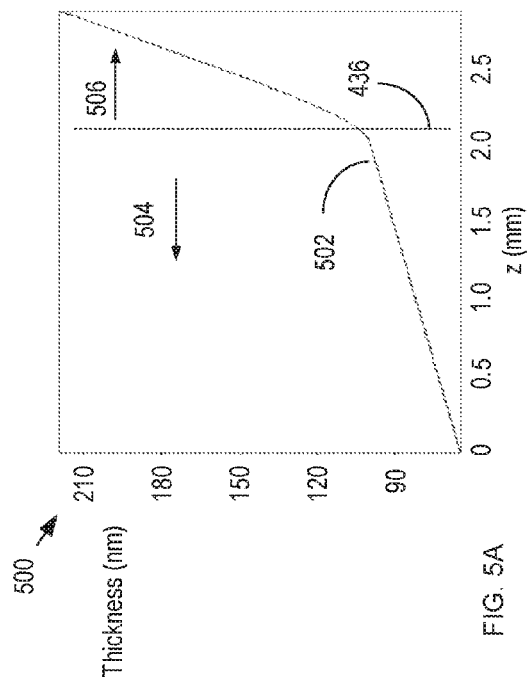
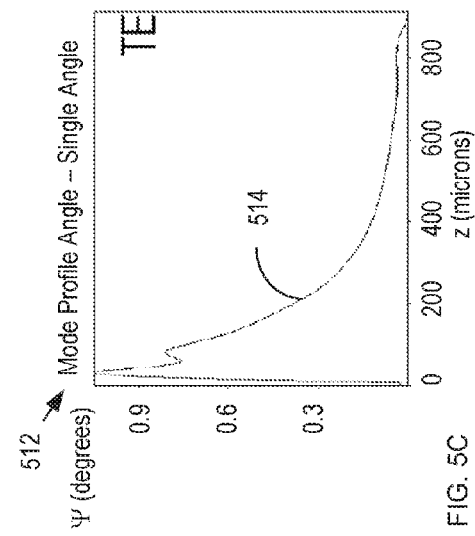
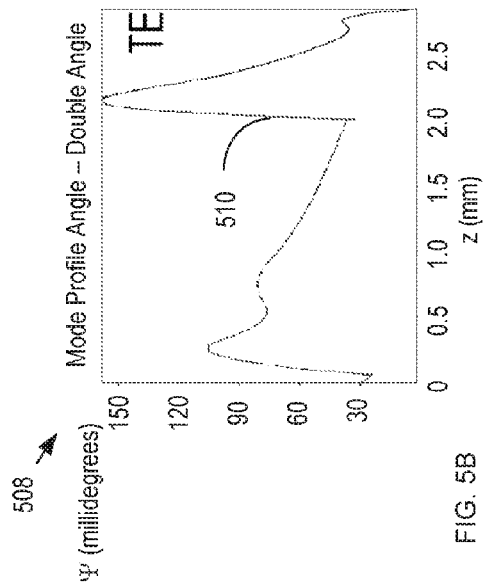
FIG. 5A
FIG. 5B
FIG. 5C

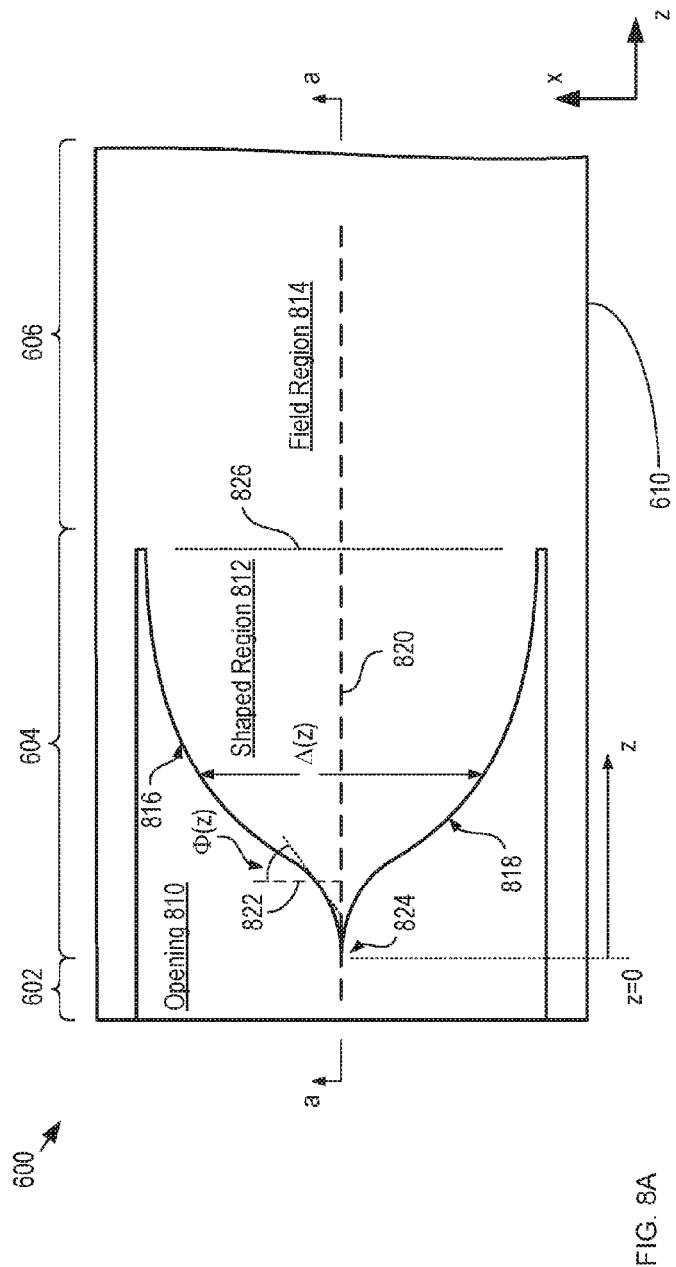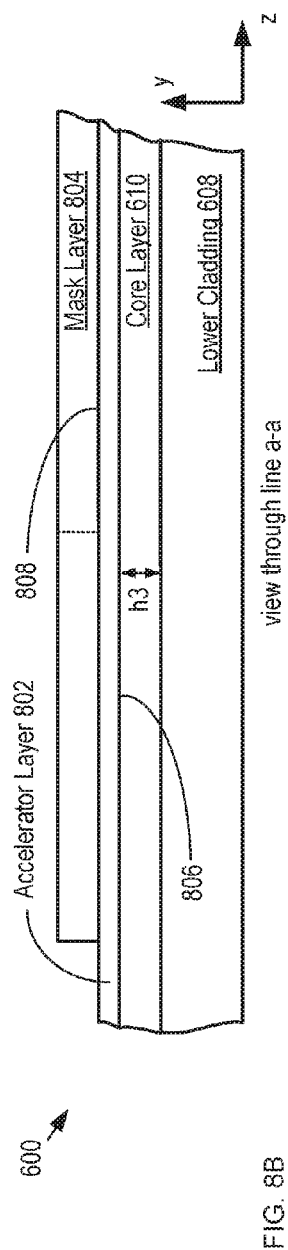
FIG. 8A
FIG. 8B

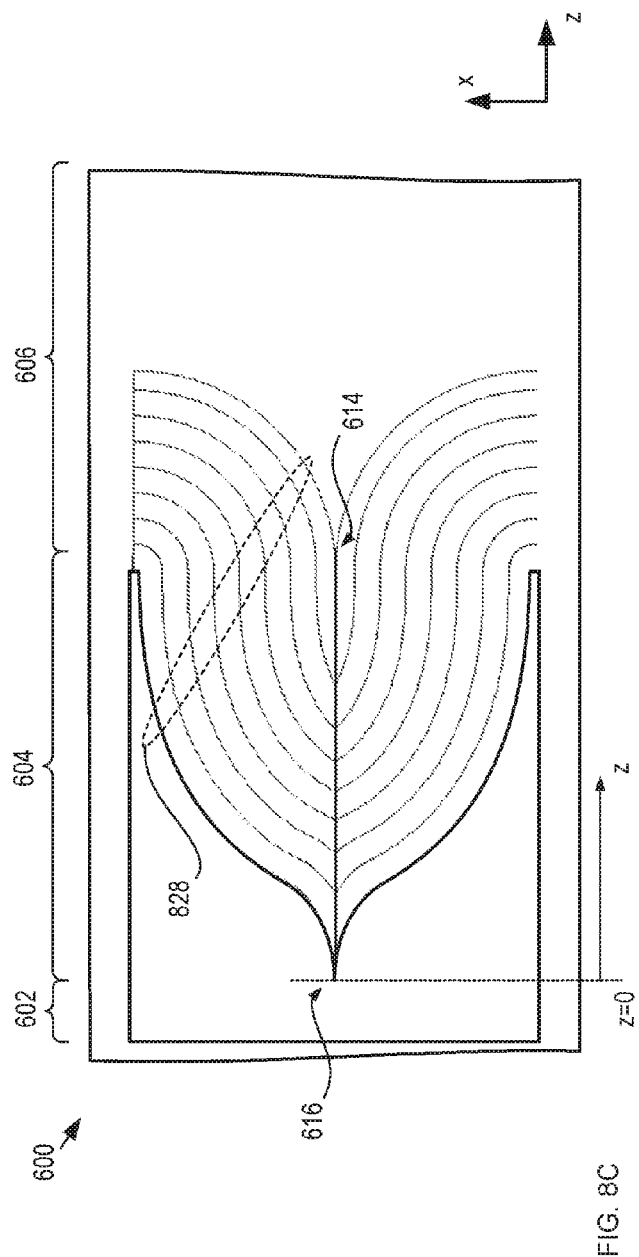
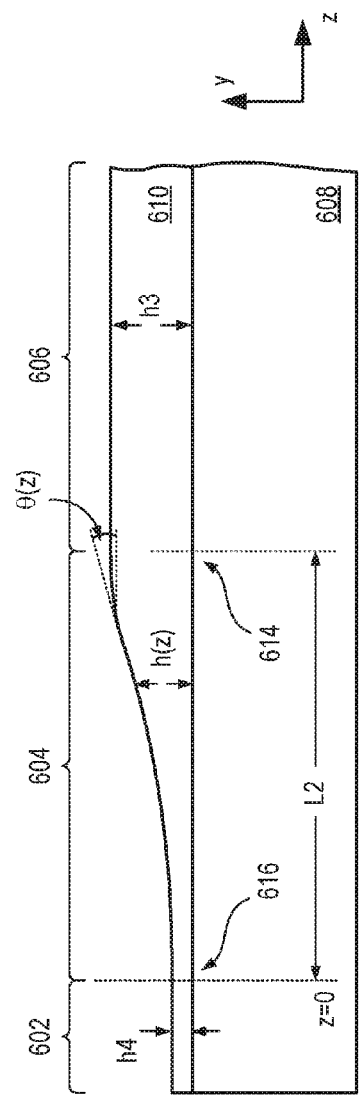
FIG. 8C
FIG. 8D

LAYER HAVING A NON-LINEAR TAPER AND METHOD OF FABRICATION

CROSS-REFERENCE TO RELATED APPLICATION

This application is a divisional patent application of co-pending U.S. patent application Ser. No. 14/270,014, filed May 5, 2014, entitled "Layer Having a Non-linear Taper and Method of Fabrication," which is a continuation-in-part of U.S. patent application Ser. No. 13/451,957 (now U.S. Pat. No. 8,718,432), filed Apr. 20, 2012, entitled "Method for Forming a Spotsize Converter," which claims the benefit of U.S. Provisional Application Ser. No. 61/477,960, filed Apr. 21, 2011, entitled "Surface waveguide-based Spot-size Converter," each of which is incorporated by reference.

FIELD OF THE INVENTION

The present invention relates to guided-wave optics in general, and, more particularly, to planar lightwave circuits.

BACKGROUND OF THE INVENTION

A surface waveguide is a light pipe that is formed on a surface of a substrate. Surface waveguides are operative for guiding light signals along paths that can include curves, loops, etc. without a significant loss of optical energy. Typically, a surface waveguide includes a central core of substantially transparent material that is surrounded by cladding material whose refractive index that is lower than that of the core material. This refractive index difference gives rise to most of the optical energy of the signal being contained within the surface waveguide core.

Surface waveguides are typically formed on rigid substrates, such as glass or silicon. Often, multiple surface waveguides are formed on a single substrate to collectively define a planar lightwave circuit (PLC). Surface waveguides can be configured to define complex structures, such as ring resonators, 1×N couplers and splitters (where N can be 2, 3, or more), and the like, which are difficult to realize using conventional optical fibers.

The "mode" of the light signal propagates primarily within the core, although a portion (commonly referred to as the "evanescent field") extends into the cladding. The shape of the mode and the size of the evanescent field depend strongly on the design of the surface waveguide. Factors such as surface-waveguide design (i.e., cross-sectional shape), index contrast (i.e., the effective refractive-index difference between the core and cladding), core size, and cladding thickness all impact how strongly optical energy is confined in the core, as well as the shape and size of the optical mode (i.e., mode profile and mode-field size).

In surface waveguides having only a small difference between the refractive indices (or effective refractive indices) of the core and cladding material (referred to herein as "low-contrast waveguides"), light is loosely confined in the core and the evanescent field is relatively large. The optical propagation loss of such surface waveguides can be very low; therefore, low-contrast waveguides are preferred in applications where low propagation loss is critical, such as for transmission in optical telecom or datacom systems.

Low-contrast waveguides typically exhibit optical propagation loss that is somewhat higher than that of a typical communications-grade optical fibers, but can also enable low-loss surface waveguide crossings, optical power splitting, and optical power coupling, which are difficult to achieve using optical fibers. Unfortunately, because they only loosely confine light signals, low-contrast waveguides are susceptible to severe losses at surface waveguide bends, as well as disruption from optical signals propagating in other low-contrast waveguides located nearby. Low-contrast waveguides, therefore, require large bending radii and are not well suited for use in high-density PLCs. As a result, low-contrast waveguide systems require a large chip area, which increases their cost. It is possible to design a low-contrast waveguide having a propagation mode that substantially matches the mode profile and mode-field size of an optical fiber, however. This can reduce optical loss that arises when a light signal is transferred between the surface waveguide and the optical fiber. They are attractive, therefore, for combined systems where a low-contrast waveguide is optically coupled with an optical fiber to add functionality to a low-loss optical system.

A surface waveguide having a large difference between the refractive indices (or effective refractive indices) of their core and cladding materials (referred to herein as a "high-contrast waveguide") tightly confines a light signal in its core such that the evanescent field is relatively small. This enables high-contrast waveguides to have extremely small bending radii. High-contrast waveguides can also be located quite close to other high-contrast waveguides without incurring significant signal interference or degradation. As a result, high-contrast waveguides enable complex circuit functionality in a relatively small chip area and are well suited to large-scale integration PLCs having densely packed surface waveguides.

Unfortunately, high-contrast waveguides typically have relatively higher optical propagation loss. Their use, therefore, has historically been limited to applications in which functionality is more important than low loss, such as sensors, power splitters, and the like. In addition, the mode profile of a high-contrast waveguide is not well matched to that of an optical fiber; therefore, the optical loss that arises when a light signal is transferred between a high-contrast waveguide and an optical fiber is typically quite large. As a result, high-contrast waveguides are not well suited for combined systems where a high-contrast waveguide is optically coupled with an optical fiber.

In some cases, it is desirable to have both high-contrast surface waveguides and low-contrast surface waveguides in the same PLC. One way to enable this is through the use of a spotsize converter, sometimes referred to as a mode-field converter. In addition, a spotsize converter can enable the use of a high-contrast surface-waveguide-based PLC with a conventional optical fiber by changing the mode profile of the high-contrast surface waveguide at its input and/or output to more closely match the mode profile of the optical fiber, thereby reducing fiber-to-chip coupling loss.

Attempts to form PLC-based spotsize converters in the prior art have typically relied on surface waveguide regions comprising a one-dimensional taper in the lateral dimension, wherein the lateral taper is formed using conventional photolithography and etching. Examples of such devices are described in "Optical spotsize converter using narrow laterally tapered surface waveguide for Planar Lightwave Circuits,"*J. Lightwave Tech.*, Vol. 22, pp. 833-839 (2004). While some improvement in coupling performance is achieved with this approach, the performance and flexibility of these devices is limited because the mode-field is only controlled in one dimension.

Silicon-core surface waveguides having tapered cores have also been investigated in the prior art, such as is described in "Spotsize converters for rib-type silicon photonic wire surface waveguides," *Proceedings of the 5th International Conference on Group IV Photonics*, Sorrento, Italy, September 17-19, pp. 200-202 (2008) and "Low loss shallow-ridge silicon surface waveguides," *Optics Express*, Vol. 18, No. 14, pp. 14474-14479 (2010). Unfortunately, while the promise of compatibility with conventional integrated circuits is attractive, the operating wavelengths and propagation losses for silicon-core surface waveguides limit their use in many applications.

In similar fashion, optical coupling between an optical fiber and a photonic crystal surface waveguide via a laterally tapered silicon-wire surface waveguide region was demonstrated in "Spotsize converter of Photonic Crystal Surface waveguide," *NTT Technical Review*, Vol. 2, pp. 36-47 (2004).

Of more promise, however, are mode-field conversion regions formed in surface waveguides that are tapered in two dimensions, such as described in "Low-Loss Compact Arrayed Surface waveguide Grating with Spot-size Converter Fabricated by a Shadow-Mask Etching Technique," *Electronics and Telecommunications Research Institute (ETRI) Journal*, Vol. 27, No. 1, pp. 89-94 (2005). While the structure of these spotsize converters shows great promise for low fiber-to-chip coupling losses, shadow-mask etching is extremely difficult to control. As a result, spotsize converters fabricated in this manner are expensive to produce in volume and are likely to suffer from variations in performance as well, making them difficult, at best, to commercialize.

An improved method forming low-cost, commercially viable spotsize converters that are operable over a wide range of wavelengths would, therefore, be highly desirable.

SUMMARY OF THE INVENTION

The present invention enables a surface waveguide-based spotsize converter having a mode-transition region that has a non-linear thickness profile, wherein the mode-transition region is shaped via a simple and controllable tapering technique that is commercially viable. Embodiments of the present invention are well suited for use in low-loss fiber-to-chip couplers, stand-alone spotsize converters, and fiber-to-fiber optical couplers, as well as for use within a PLC to adiabatically couple surface waveguide regions having different index contrast.

A spotsize converter in accordance with the present invention comprises a first region having a first mode-field size, a second region having a second mode-field size, and a mode-transition region that optically couples the first and second region, wherein the transition region is tapered in the vertical dimension such that the thickness of at least one of its constituent layers changes monotonically along the length between the first and second regions.

In an illustrative embodiment, a tapered transition region is formed via an accelerator layer that etches laterally in an etchant. The accelerator layer is disposed on a surface of an underlying first layer, whose material is also etched by the etchant. A mask layer is formed on the top surface of the accelerator layer, wherein the mask includes a shaped region and a field region that are aligned along a first axis. The shaped region includes opposing sides that meet at an initial point on the first axis and move away from the first axis in non-linear fashion as a function of distance along the first axis. When exposed to the etchant, a lateral etch front proceeds normally inward from each point on the sides, undercutting the mask layer in the shaped region. As the lateral etch front proceeds under the mask layer, an increasing amount of the surface of the first layer is exposed to the etchant. This results in a thickness change in the first layer that varies as a function of distance from the sides, as well as the distance along the first axis. The thickness profile is controlled by controlling the relative etch rates of the materials of the accelerator layer and the first layer in the etchant, as well as the shape of the sides.

The illustrative embodiment of the present invention comprises a ridge waveguide having a first region, second region, and third region that is between the first region and second region. The surface waveguide comprises a core of silicon nitride that surrounded by silicon dioxide. The core has a thickness in the first region that is approximately 65 nanometers (nm). The core has a thickness in the second region that is approximately 220 nm. The thickness of the core in the third region changes in substantially sinusoidal fashion from 65 nm where it meets the first region to 220 nm where the outer core meets the second region. The width of the core also changes along the length of the third region from a width of approximately 65 nm wherein the third region abuts the first region to a width of approximately 1 micron where the third region abuts the second region. In some embodiments, the width also changes substantially sinusoidally in the third region. In some embodiments, the width of the core remains substantially uniform through all three regions.

An embodiment of the present invention is a method comprising: providing a first layer of a first material, wherein the first material etches at a first etch rate in a first etchant; providing an accelerator layer disposed on the first layer, the accelerator layer comprising a second material, wherein the second material etches at a second etch rate in the first etchant; providing a mask layer that is disposed on the accelerator layer, the mask layer comprising a field region and a shaped region that abuts the field region at a first end and extends from the field region along a first axis to a tip, the shaped region having opposing first and second sides that meet at the tip, wherein the first and second sides collectively define a first width that increases nonlinearly from the tip to the first end; laterally etching the accelerator layer in the first etchant such that the shaped region is undercut along directions normal to each point on the first side and second side; and etching the first layer in the first region in the first etchant such that the thickness of the first layer increases nonlinearly from the tip to the first end.

Another embodiment of the present invention is a composition comprising: a first layer having a first region, second region, and third region that is between the first region and second region, wherein the third region abuts the first region at a first point along a first axis, and wherein the third region abuts the second region at a second point along the first axis; wherein the first layer has a first thickness in the first region, a second thickness in the second region, and a thickness in the third region that changes in non-linear fashion between the first point and the second point.

BRIEF DESCRIPTION OF THE DRAWINGS

FIGS. 4A and 4B depict schematic drawings of top and side views, respectively, of a surface waveguide core of a spotsize converter having a double-angle taper thickness profile.

FIG. 5A depicts a plot of taper profile for an exemplary spotsize converter having a double-angle taper region.

FIG. 5B depicts a plot of mode-profile angles induced by an exemplary double-angle taper region.

FIG. 5C depicts a plot of mode-profile angles induced by an exemplary single-angle taper region.

FIGS. 8A-D depict schematic drawings of views of spotsize converter 600 at different points in its fabrication.

DETAILED DESCRIPTION

Figure 1:
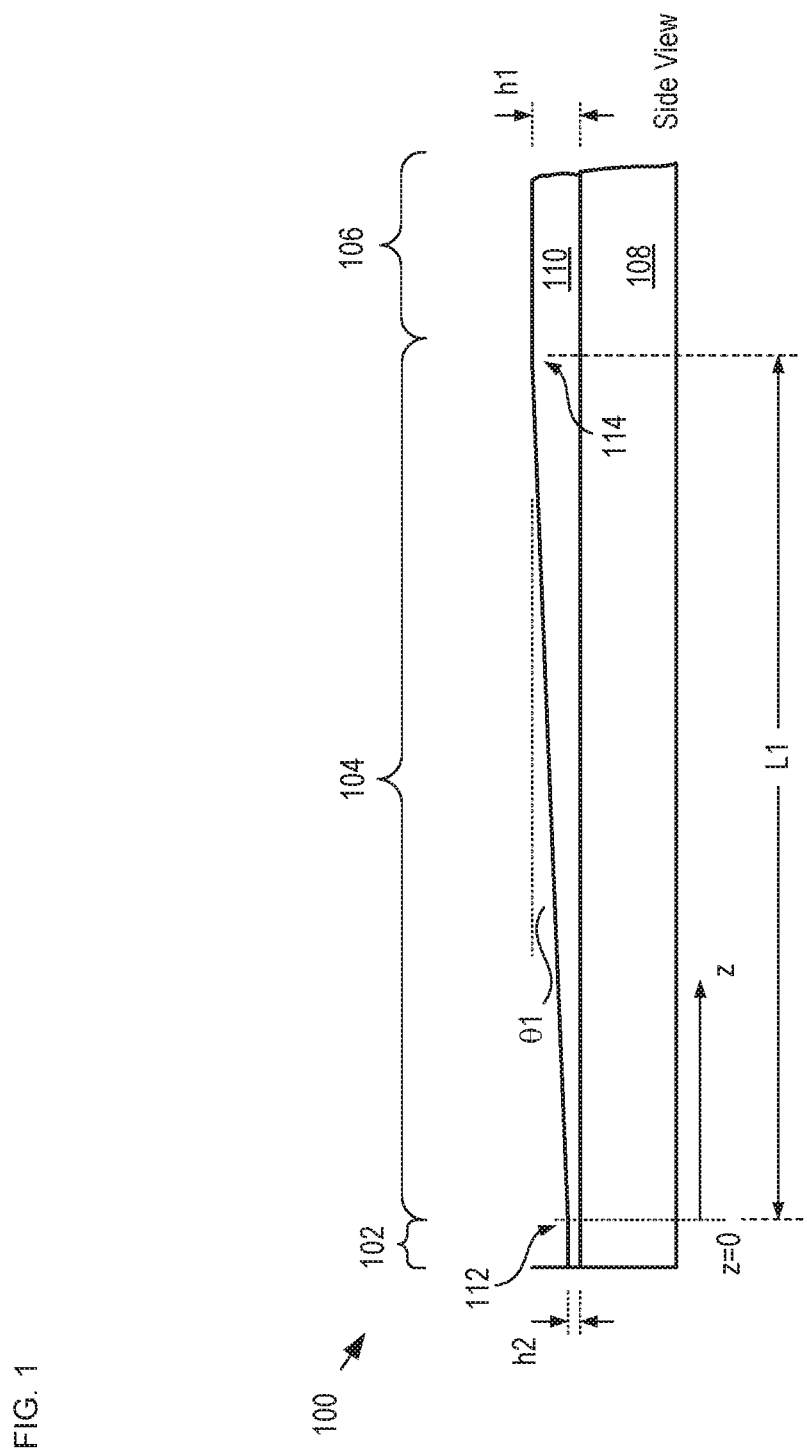
FIG. 1 depicts a schematic drawing of a side view of a ramp formed via an exemplary accelerator-layer tapering process.

The following terms are defined for use in this Specification, including the appended claims:

Disposed on or Formed on is defined as "exists on" an underlying material or layer. A first layer can be disposed on a second layer with intermediate layers, such as transitional layers, separating the first layer and second layer. For example, if a material is described to be "disposed (or grown) on a substrate," this can mean that either (1) the material is in intimate contact with the substrate; or (2) the material is in contact with one or more intermediate layers that reside on the substrate.

Monotonically is defined as only increasing or decreasing. In other words, the first derivative of a monotonically changing function never changes sign. For example, a layer whose thickness increases monotonically along a first direction has a thickness that never decreases along the first direction. It should be noted that the thickness of a layer can change in either a linear or non-linear fashion and still be considered to be changing monotonically.

Low-contrast region is defined as a region of a planar-lightwave circuit comprising one or more low-contrast waveguides.

High-contrast region is defined as a region of a planar-lightwave circuit comprising one or more high-contrast waveguides.

As discussed in U.S. patent application Ser. No. 13/451,957 (i.e., the parent application), the design parameters of a surface waveguide (i.e., cross-sectional shape, core size, core and cladding materials, index contrast, cladding thickness, etc. dictate the mode propagation characteristics of the surface waveguide. (i.e., mode profile, mode-field size, mode confinement, etc.). As a result, a spot-size converter can be formed by changing one or more of these parameters along a transition region within a surface waveguide such that the mode propagation characteristics (e.g., mode profile, mode-field size, etc.) of the surface waveguide can be converted from one configuration to another.

Prior-art spot-size converters, and the methods by which they are made, have several drawbacks, however. For example, prior-art fabrication methods are very difficult to control and reproduce and, therefore, are not well suited for high-volume commercial use. Still further, these methods are limited to formation of only substantially linear taper regions.

In addition, the length of the transition region in a prior-art spotsize converter is often limited by the methods used to form it. Taper length is an important parameter for achieving adiabatic mode-conversion; therefore, this constrains the range of design for surface waveguides included in prior-art spotsize converters.

The parent application, however, disclosed an accelerator-layer tapering method suitable for forming one- or two-dimensional taper regions in a material layer. Before describing the present invention, it will be instructive to provide a brief example of the formation of a linear ramp (i.e., a one-dimensional taper) using accelerator-layer tapering. Additional details regarding the accelerator-layer tapering method, for both 1D and 2D structures, can be found in the parent application.

Accelerator-Layer Tapering Process

FIG. 1 depicts a schematic drawing of a side view of a ramp formed via an exemplary accelerator-layer tapering process. Substrate region 100 includes regions 102, 104, and 106, each of which includes substrate 108 and layer 110. Region 104 extends from first end 112, where it abuts region 102, to second end 114, where it abuts region 106.

Figure 2A:
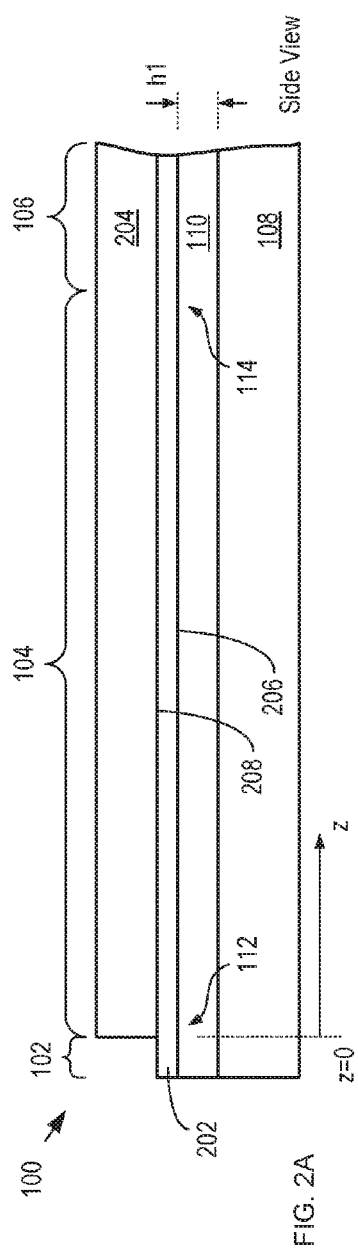
FIGS. 2A-C depict schematic drawings of side views of a substrate region comprising a tapered region at different points during an exemplary accelerator-layer tapering process.
Figure 2B:
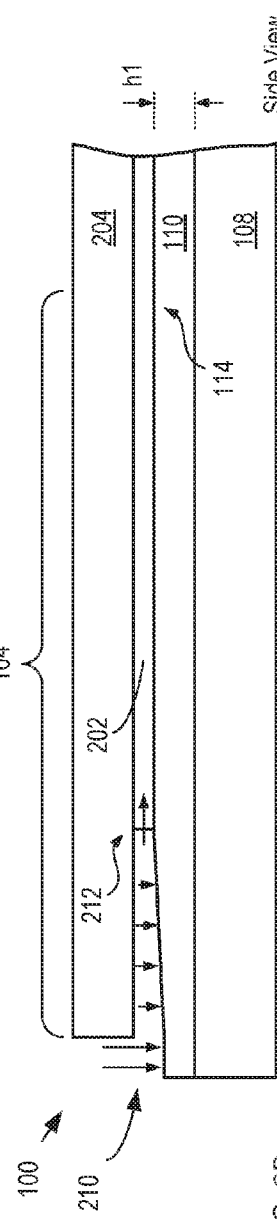
Figure 2C:
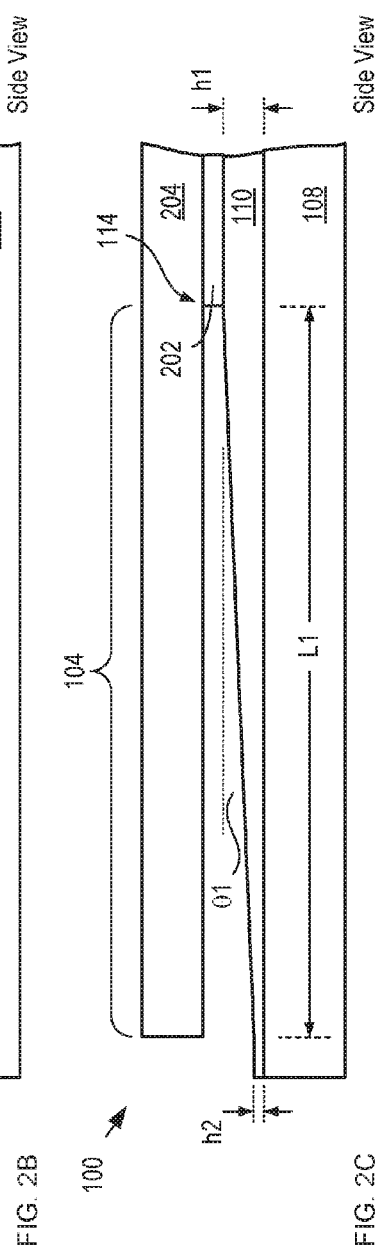

FIGS. 2A-C depict schematic drawings of side views of a substrate region comprising a tapered region at different points during an exemplary accelerator-layer tapering process.

Figure 3:
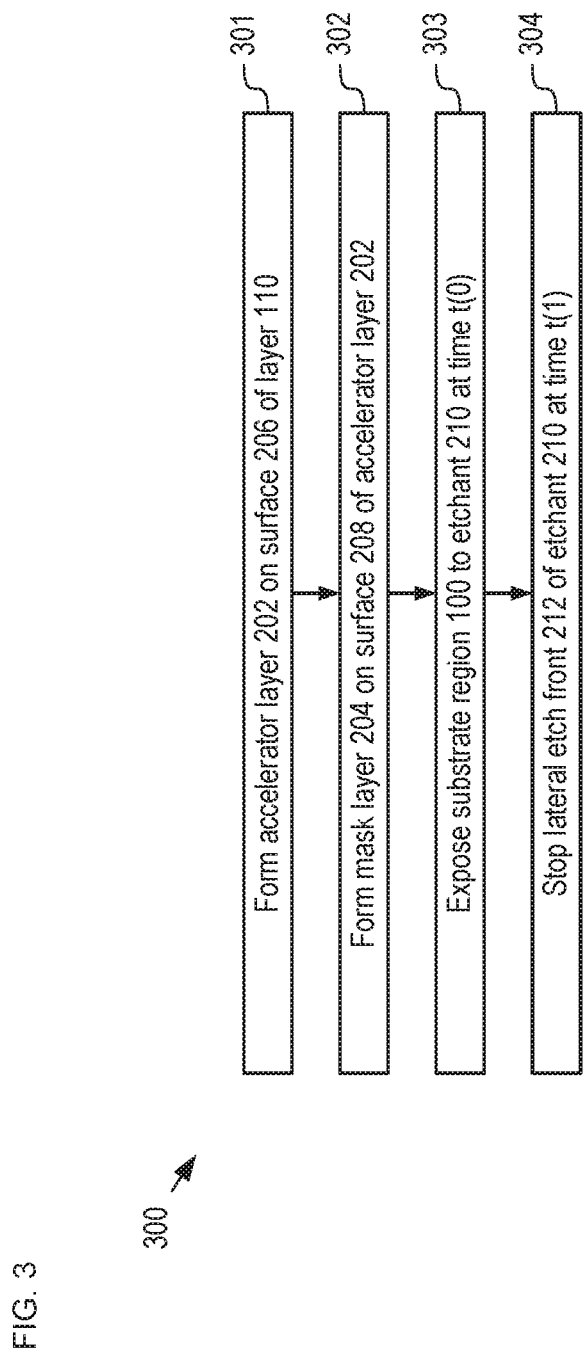
FIG. 3 depicts operations of an exemplary one-dimensional accelerator-layer tapering process.

FIG. 3 depicts operations of an exemplary one-dimensional accelerator-layer tapering process. FIG. 3 is described with continuing reference to FIGS. 1 and 2A-C.

Method 300 begins with operation 301, wherein accelerator layer 202 is formed on surface 206 of layer 110. Layer 110 is a planar layer of stoichiometric silicon nitride having a thickness, h1.

Although layer 110 comprises silicon nitride in this example, it will be clear to one skilled in the art, after reading this Specification, that the accelerator-layer tapering process is suitable for tapering any layer of material whose structure does not inhibit substantially uniform etch rate in all dimensions. Materials for which an accelerator-layer tapering process is suitable include, without limitation, dielectrics, silicon oxides, glasses, plastics, ceramics, silicon, polysilicon, amorphous silicon, amorphous and polycrystalline silicon-containing compounds (e.g., silicon carbide, etc.), crystalline III-V compound semiconductors, polycrystalline III-V compound semiconductors, amorphous III-V compound semiconductors, crystalline II-VI compound semiconductors, polycrystalline II-VI compound semiconductors, amorphous II-VI compound semiconductors, metals, and composite materials.

Accelerator layer 202 comprises a sacrificial material that etches in a first etchant that also etches the material of layer 110. Typically, the material of accelerator layer 202 is selected such that it etches at a faster rate in the first etchant than the material of layer 110. One skilled in the art will recognize that the material of accelerator layer 202 is a matter of design choice and will depend on the material of layer 110 and available etchants.

At operation 302, mask layer 204 is formed and patterned on accelerator layer 202. Mask layer 204 is patterned to expose surface 208 of accelerator layer 202 in region 102, but initially protect surface 208 in regions 104 and 106. The edge of mask layer 204 is located at first end 112 (i.e., at z=0).

FIG. 2A depicts a cross-sectional view of substrate region 100 after the formation of mask layer 204 on accelerator layer 202.

At operation 303, substrate region 100 is exposed to etchant 210 at time t(0).

Etchant 210 comprises a chemical (e.g., nitric acid, etc.) that etches the material of accelerator layer 202 at a faster rate than the material of layer 110. As a result, accelerator layer 202 is removed quickly in region 102 and etchant 210 begins to attack underlying layer 110 uniformly across the region. At the same time, etchant 210 begins to etch accelerator layer 202 laterally along the z-direction from first end 112 toward second end 114, undercutting mask layer 204 along the z-direction. In some embodiments, accelerator layer 202 is removed from region 102 via a different etch (preferably, a directional etch) that removes its material selectively over the material of layer 110. This ensures a clean starting condition at first end 112 for the lateral etching of accelerator layer 202 in region 104. It can also improve the uniformity of the vertical etching of layer 110 in region 102.

FIG. 2B depicts a cross-sectional view of substrate region 100 during operation 303.

Etch front 212 moves along the z-direction at a substantially constant velocity, thus exposing a linearly increasing amount of surface 206.

At operation 304, the etching of layer 110 by etchant 210 is stopped at time t(1). Time t(1) is selected based on the etch rate of the material of layer 110 in etchant 210, initial thickness, h1, final thickness, h2, and the desired length, L1, of taper region 104.

Second end 114 is defined by the point at which etch front 212 is stopped in operation 204. As a result, no etching of layer 110 occurs at second end 114 (or beyond it in region 106) because etchant 210 has no time to attack layer 110 at surface 206. At second end 114 and in region 106, therefore, layer 110 remains at its deposited thickness, h1. At first end 112 and in region 102, however, etchant 210 etches layer 110 for substantially the entire time period from t(0) to t(1), resulting in final thickness, h2, for layer 110. Between first end 112 and second end 114, the exposure time of layer 110 in etchant 210 is a linearly decreasing function of distance along the z-direction from first end 112. Etchant 210, therefore, creates a linearly increasing thickness of layer 110 (from h2 to h1) from first end 112 to second end 114. It should be noted that the magnitude of the taper angle, θ1, is dependent upon the relative etch rates of the materials of accelerator layer 202 and layer 110 in etchant 210. The relationship between θ1 and these etch rates can be described as:

$$\theta 1 = \arctan\left(\frac{ER1}{ER2}\right), \quad (1)$$

where ER1 is the etch rate of the material of layer 110 and ER2 is the lateral etch rate of accelerator layer 202 in etchant 210.

One skilled in the art will recognize that the density of the materials used in accelerator layer 202 and layer 110 impact their respective etch rates in an etchant. As a result, each etch rate can vary for the same material depending on how that material was formed (e.g., deposition temperature, annealing temperature, annealing time, etc.).

FIG. 2C depicts a cross-sectional view of substrate region 100 after operation 304.

As further discussed in the parent application, accelerator-layer tapering can be implemented so as to form regions having tapers that are mutually non-orthogonal (e.g., a beveled region or wedge), as well as, by judicious design of mask features, taper regions having non-linear tapers.

FIGS. 4A and 4B depict schematic drawings of top and side views, respectively, of a surface waveguide core of a spotsize converter having a double-angle taper thickness profile. Surface waveguide core 400 comprises low-contrast region 402, taper region 404, and high-contrast region 406. Low-contrast region 402, taper region 404, and high-contrast region 406 are formed in core layer 408 using accelerator-layer tapering, as described above. Core layer 408 is disposed on conventional lower cladding 410.

Taper region 404 includes first taper region 412 and second taper region 414, each of which has a different taper angle. In each of low-contrast region 402 and high-contrast region 406, surface waveguide core 400 is a ridge of stoichiometric silicon nitride having a substantially rectangular cross-sectional shape having a thickness that is typically within the range of a few nm to approximately 300 nm and a width that is typically within the range of a few nm to tens of microns. In some embodiments, core 400 has a different shape, such as square, irregular (e.g., a "u" shape, "T" shape, etc.). FIG. 4 depicts surface waveguide core 400 after its thickness has been tapered but prior to the removal of mask layer 418 and accelerator layer 416. Waveguide core 400 is also depicted prior to its lateral definition.

In forming surface waveguide core 400, mask layer 418 is first formed on the surface of accelerator layer 416 and patterned to define opening 420, wedge 422, and field region 424. Opening 420 defines low-contrast region 402. Each of the sides of wedge 422 form angle Φ1 relative to line 426 and θ2 relative to propagation axis 428. Line 426 is a line normal to optical propagation axis 428, as shown. Field region 424 protects second taper region 414 and high-contrast region 406 in the same manner as is described above and with respect to one-dimensional accelerator-layer tapering.

Wedge 422 protects core layer 408 and accelerator layer 416 from vertical attack during the taper etch that forms taper region 404; however, accelerator layer 416 enables accelerator-layer etching of the core layer to proceed along three directions—the z-direction, direction 432, and direction 434, as shown. As a result, accelerator layer 416 is etched laterally at a faster rate in first taper region 412 than in second taper region 414, resulting in a more gradual tapering of core layer 408 in first taper region 412 than in second taper region 414. Iso-height profiles 430 indicate vertical height changes of 10 nm. The more gradual height change in first taper region 412 defines a substantially linear slope having an angle θ2 with respect to the original top surface of core layer 408, while the more rapid height change in second taper region 414 defines a substantially linear slope having an angle θ3 with respect to the original top surface of core layer 408. Boundary 436 denotes an approximate transition between first taper region 412 and second taper region 414. Boundary 438 denotes an approximate transition between second taper region 414 and high-contrast region 406.

The value of θ3 depend on the relative etch rates of accelerator layer 416 and core layer 408, as described above and with respect to θ1 of FIG. 2C. The values of θ2 and θ3, however, are also dependent upon angle Φ1 of wedge 422, as follows:

$$\theta_2 = \arctan\left(\frac{ER1}{ER2} \cdot \cos(\Phi 1)\right), \quad (2)$$

$$\theta_3 = \arctan\left(\frac{ER1}{ER2}\right). \quad (3)$$

It can be seen from this equation that the magnitude of angle θ2 is inversely dependent on wedge angle Φ1.

FIG. 5A depicts a plot of taper profile for an exemplary spotsize converter having a double-angle taper region. Plot 500 shows the thickness of a taper region of a core layer formed using a wedge 422 having angle Φ1 of approximately 85°. As cos(85°) is approximately 1/10, the angles θ2 and θ3 have this ratio. In taper region 412, taper angle θ2 is approximately 0.001°, while in taper region 414, taper angle θ3 is approximately 0.010°. Boundary 436 denotes the approximate transition between angles θ2 and θ3.

FIGS. 5B and 5C depict plots of a mode profile angles induced by an exemplary double-angle taper region and a single-angle linear taper region, respectively.

Plot 508 shows the mode profile angle, Ψ, induced by the taper angle of a double-angle linear taper having taper angles θ2 and θ3 of 0.001° and 0.010°, respectively for TE polarized light at 1550 nm. For comparison, plot 512 shows the mode profile angle, Ψ, induced by the taper angle of a simple linear taper for TE polarized light at 1550 nm. A comparison of plots 508 and 512 shows that the angle of the mode profile induced by the double-angle taper region is improved over that of the simple linear taper region.

As disclosed in the parent application, the techniques used to define the double-angle taper described above can also be used to define a taper having a non-linear, relatively complex vertical profile, such as a ramp having a steadily curving or substantially sinusoidal profile. Such layers can be advantageously used in the core and/or cladding layers of a transition region of a spot-size converter, as they can facilitate an adiabatic transition from one guided-mode profile to another.

Figures 6A, 6B:
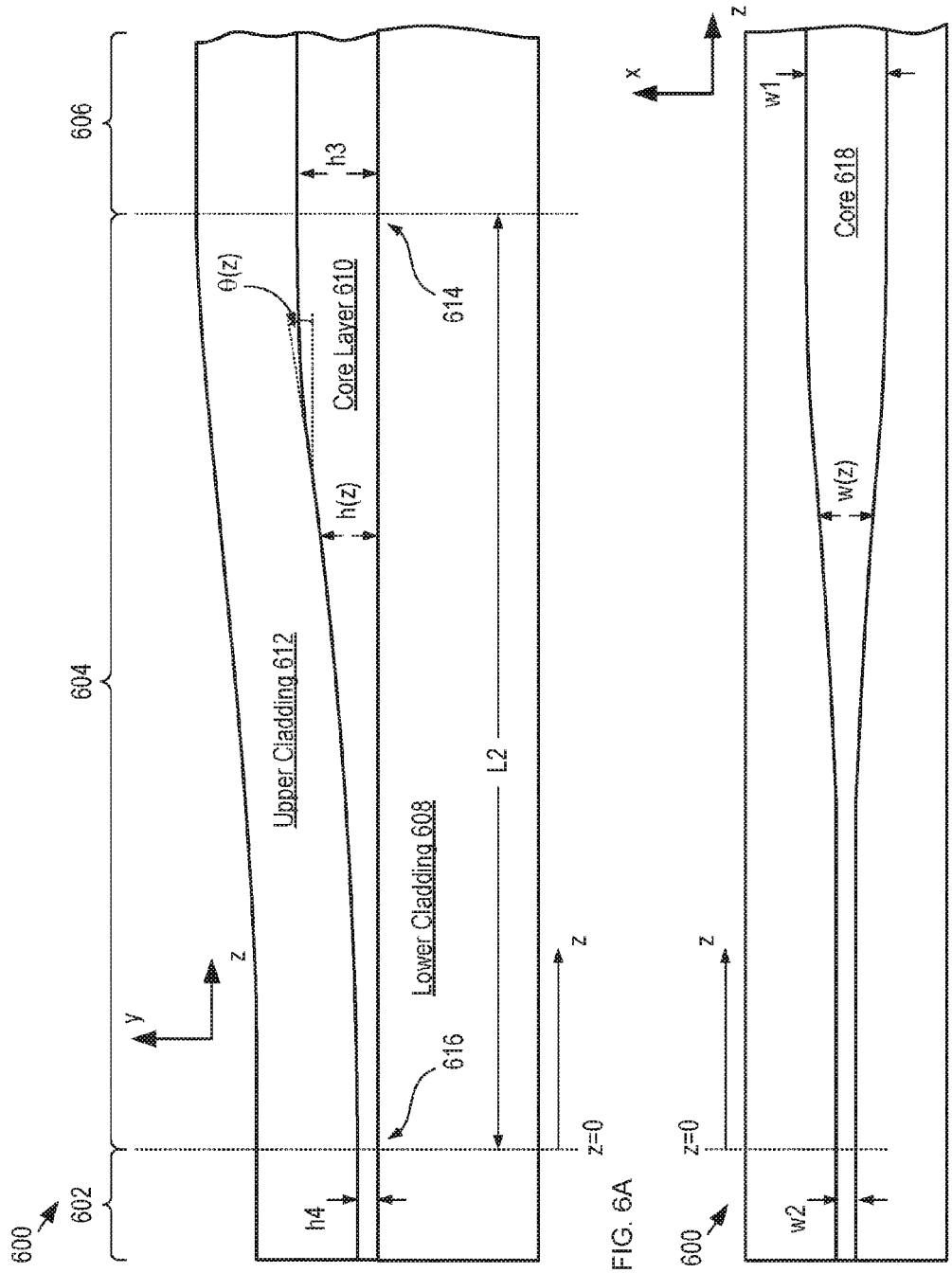
FIGS. 6A-B depict schematic drawings of side and top views, respectively, of a spotsize converter having a substantially sinusoidally tapered core layer in accordance with an illustrative embodiment of the present invention.

FIGS. 6A-B depict schematic drawings of side and top views, respectively, of a spotsize converter having a substantially sinusoidally tapered core layer in accordance with an illustrative embodiment of the present invention. Spotsize converter 600 comprises low-contrast region 602, taper region 604, and high-contrast region 606. In each of these regions, spotsize converter 600 includes a waveguide structure comprising lower cladding 608, core layer 610, and upper cladding 612. The thickness of core layer 610 varies, from h3 at first end 614 to h4 at second end 616, as a substantially sinusoidal function of position along the z-direction within taper region 604, as described below.

Low-contrast region 602 and taper region 604 are formed by tapering core layer 608 using accelerator-layer tapering, as described above.

Figure 7:
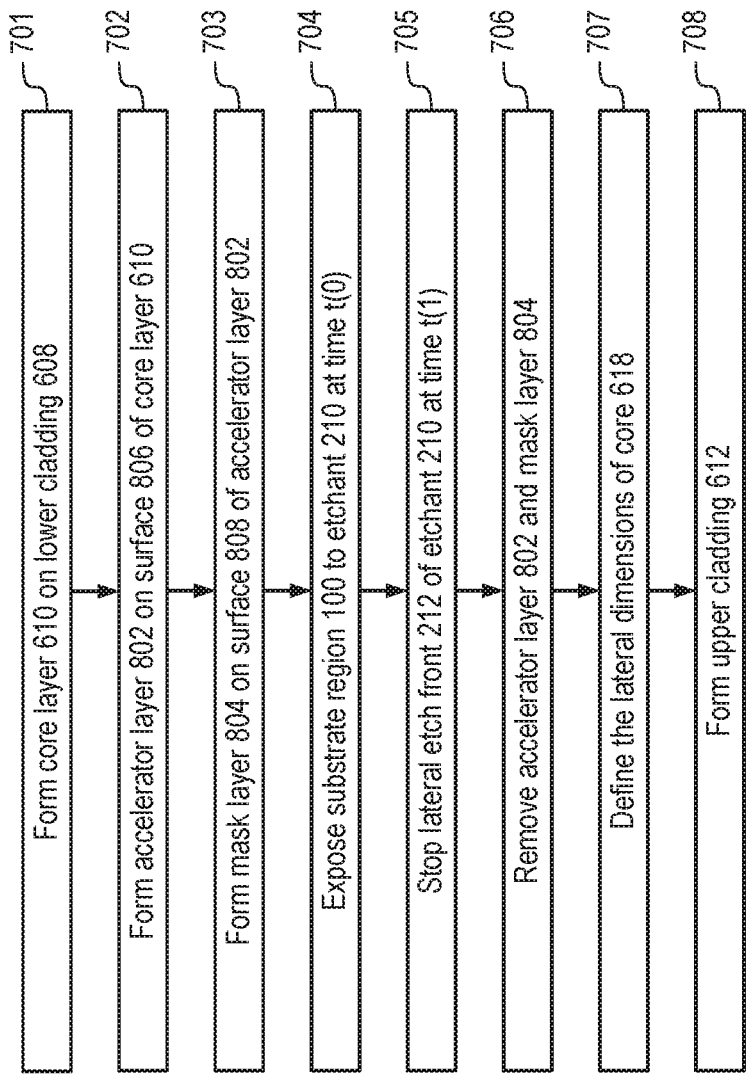
FIG. 7 depicts operations of a method suitable for forming a spotsize converter in accordance with the illustrative embodiment.

FIG. 7 depicts operations of a method suitable for forming a spotsize converter in accordance with the illustrative embodiment. Method 700 begins with operation 701, wherein core layer 610 is formed on lower cladding 608.

FIGS. 8A-D depict schematic drawings of views of spotsize converter 600 at different points in its fabrication.

Lower cladding 608 is a conventional lower cladding layer having a thickness and refractive index suitable for use with core layer 608. In the illustrative embodiment, lower cladding 608 is a layer of thermally grown silicon dioxide having a thickness within the range of 5 microns to 50 microns, and preferably 15 microns. It will be clear to one skilled in the art that the material and thickness of lower cladding 608 are matters of design and that any practical thickness and/or material can be used.

Core layer 610 is a layer of stoichiometric silicon nitride having a thickness, h3, within the range of approximately 50 nm to approximately 300 nm. In the illustrative embodiment, core layer 610 has a thickness of approximately 220 nm. Typically, core layer 610 is grown on lower cladding 608 using Low-Pressure Chemical Vapor Deposition (LPCVD); however, one skilled in the art will recognize that any suitable method can be used to form core layer 610.

At operation 702, accelerator layer 802 is formed on surface 806 of core layer 610.

At operation 703, mask layer 804 is formed on surface 808 of accelerator layer 802 and patterned to define opening 810, shaped region 812, and field region 814.

FIGS. 8A-B depict schematic drawings of top and side views, respectively, of nascent spotsize converter 600 after formation of mask layer 804. FIG. 8B depicts a cross-sectional view through line a-a of FIG. 8A, as indicated.

Opening 810 defines the area of core layer 610 in which low-contrast region 602 is defined. Opening 810 includes sides 816 and 818 that extend from tip 824 to end 826, where shaped region 812 abuts field region 814. Sides 816 and 818 define the width, Δ(z), of shaped region 812, which typically increases monotonically from tip 824 to end 826. Each of sides 816 and 818 has a shape that gives rise to a desired thickness taper profile for core layer 610 in transition region 604. The shape of sides 816 and 818 is calculated from the desired vertical profile of transition region 804.

At each point along the z-direction, each of sides 816 and 818 forms an instantaneous angle Φ relative to line 822, which is a line drawn normal to propagation axis 820 at that point (i.e., the line aligned with the x-direction at the given z, as shown). This instantaneous angle defines the shape of opening 810.

Figure 9:
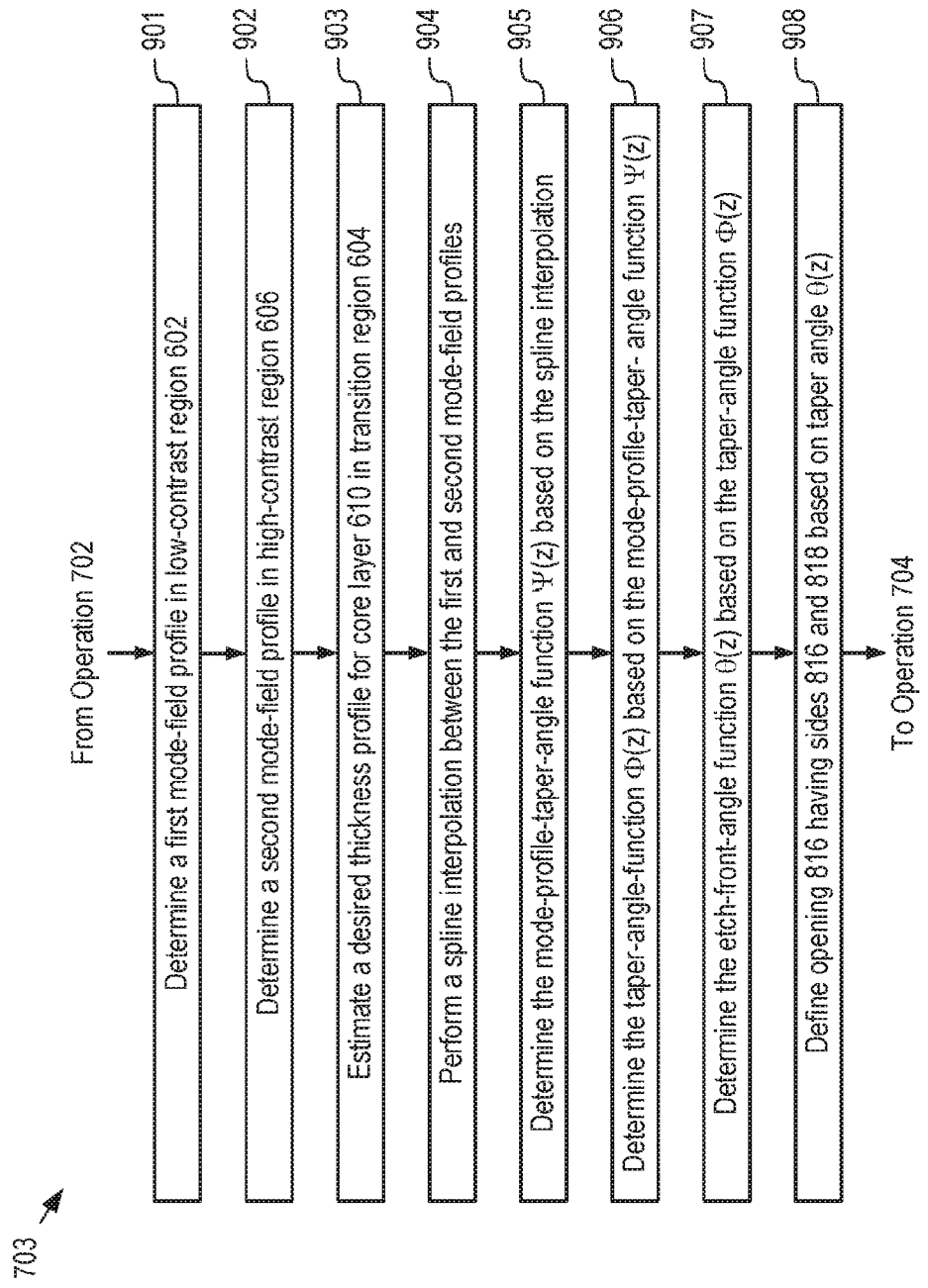
FIG. 9 depicts operations of a method suitable for determining the shape of opening 810 in accordance with the illustrative embodiment of the present invention.

FIG. 9 depicts operations of a method suitable for determining the shape of opening 810 in accordance with the illustrative embodiment of the present invention. Method 900 begins with operation 901, wherein the desired mode-field profile of a light signal in low-contrast region 602 is determined. It should be noted that the mode-field profile is defined by the mode-field diameters in both the x- and y-directions for each polarization of the light signals (e.g., TE and TM, right- and left-hand circular, etc.). One skilled in the art will recognize that the mode-field profile in a surface waveguide is based on several factors, including the materials of the core and cladding of the waveguide, the vertical and lateral dimension (i.e., width) of the waveguide, and the wavelength of the light.

At operation 902, the desired mode-field profile of the light signal in high-contrast region 606 is determined.

At operation 903, an estimate of a desired thickness profile, h(z), is determined for core layer 610 in transition region 604. In the illustrative embodiment, the desired thickness profile approximates a sine-bend shape and is described by:

$$h(z) = \frac{O_{sine}}{L_{sine}}z - \frac{O_{sine}}{2\pi}\sin\left(\frac{2\pi}{L_{sine}}z\right), \quad (4)$$

where $L_{sine}$ is the length, L2, of transition region 604 along the z-direction, and $O_{sine}$=(h1−h2)/2. In some embodiments, the desired thickness profile, h(z), is other than a sine-bend shape (e.g., an exponential function, etc.). Typically, the desired thickness profile in transition region 604 is based on the application for which spotsize converter 600 is intended.

At operation 904, a spline interpolation is performed to determine a smooth interpolation between the mode-field profiles in the low-contrast and high-contrast regions. The mode-field profile in transition region 604 can be described by a numerical function MFD(h(z)). In some embodiments, MFD(h(z)) is calculated for several intermediate thicknesses along transition region 604 such that the spline interpolation provides an MFD(h(z)) that is a substantially smooth numerical function.

At operation 905, a mode-profile-angle function Ψ(z) suitable for generating the result of the spline interpolation is calculated based on MFD(h(z)) and Equations (1) and (2) above, as well as the length, L2, of transition region 604. It should be noted that the mode-profile angle Ψ indicates the rate at which the mode profile changes along the z-direction.

At operation 906, taper-angle function θ(z) is calculated so as to give rise to the desired mode-profile-angle function Ψ(z). The instantaneous taper-angle 9 is defined as the angle formed, at any given z, between the tangent to the top surface of core layer 610 and a line parallel to a horizontal plane (e.g., the top surface of lower cladding 608, as shown in FIG. 8D).

At operation 907, etch-front-angle function φ(z) is defined for each of sides 816 or 818 so as to give rise to taper-angle function θ(z). Etch-front-angle function φ(z) dictates the etch-front angle at each point on sides 816 and 818 for each point z along shaped region 812. For the purposes of this Specification, including the appended claims, the term "etch-front angle" is defined as the magnitude of the angle formed between a line drawn normal to the propagation axis at a point z and a line drawn tangent to a side of a shaped region at that z. Etch-front-angle function φ(z) determines the magnitude of the distance between each of sides 816 and 818 and propagation axis 820 (i.e., the width of shaped region 812) from tip 824 to end 826.

Finally, at operation 908, the shape of opening 810 is defined such that sides 816 and 818 are characterized by etch-front-angle function φ(z).

Figure 10B:
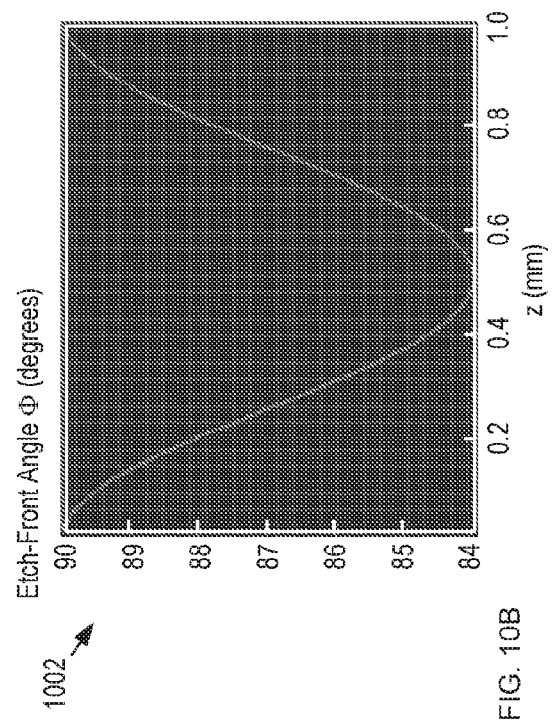
FIGS. 10A-B depict plots of the magnitude of etch-front angle $\varphi$ as a function of distance, z, for taper regions having lengths of 2 mm and 1 mm, respectively.
Figure 10A:
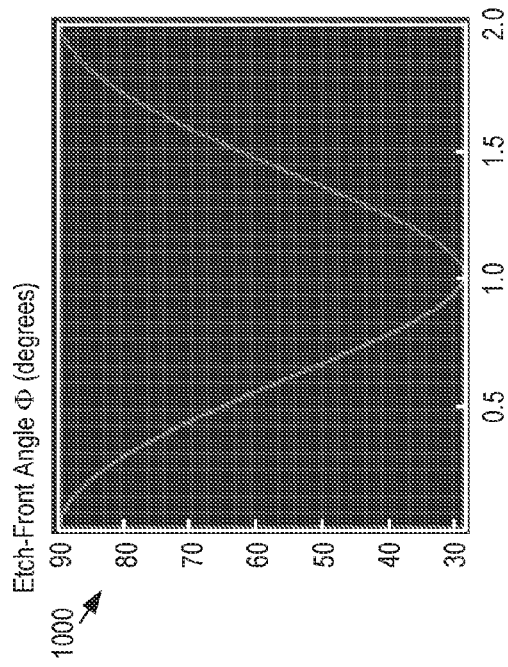

FIGS. 10A-B depict plots of the magnitude of etch-front angle φ as a function of distance, z, for taper regions having lengths of 2 mm and 1 mm, respectively.

Returning now to method 700, at operation 704, nascent spotsize converter 600 is exposed to a suitable etchant (e.g., etchant 210) at time t(0). As discussed above and with respect to FIGS. 2A-C, the etchant is selected such that it etches the material of accelerator layer 802 at a faster rate than the material of core layer 610. As a result, accelerator layer 802 is removed quickly in region 602 and the etchant begins to etch the accelerator layer laterally along the z-direction, as well as along directions normal to sides 816 and 818, thereby undercutting mask layer 804.

As the etchant undercuts mask layer 804, the etch fronts from each exposed edge of shaped region 812 begin to meet. Since the lateral extent of shaped region 812 is a function of z, the duration of the exposure of surface 806 to the etchant is a function of both φ(z) and z. As a result, the thickness of core layer 610 in shaped region 812 is based on t, φ(z), and z. Along the z-direction, therefore, the profile of core layer 610 can be selected as nearly any desired monotonically increasing function of z, by judicious selection of φ(z). In the illustrative embodiment, this profile is substantially a portion of a sinusoid; however, it will be clear to one skilled in the art, after reading this Specification, how to specify, make, and use tapered regions having any suitable substantially monotonically changing vertical profile, including linear, piecewise linear, non-linear, sinusoidal, curved, irregular, and the like.

At operation 705, the etching of core layer 610 is stopped at time t(1). Time t(1) is selected based on the etch rate of the material of layer 110 in etchant 210, initial thickness, h3, final thickness, h4, and the desired length, L2, of taper region 604.

FIGS. 8C and 8D depict top and side views, respectively, of nascent spotsize converter 600 after the tapering of core layer 610. In FIG. 8C, iso-height lines 828 indicate height changes of approximately 20 nm.

Figure 11B:
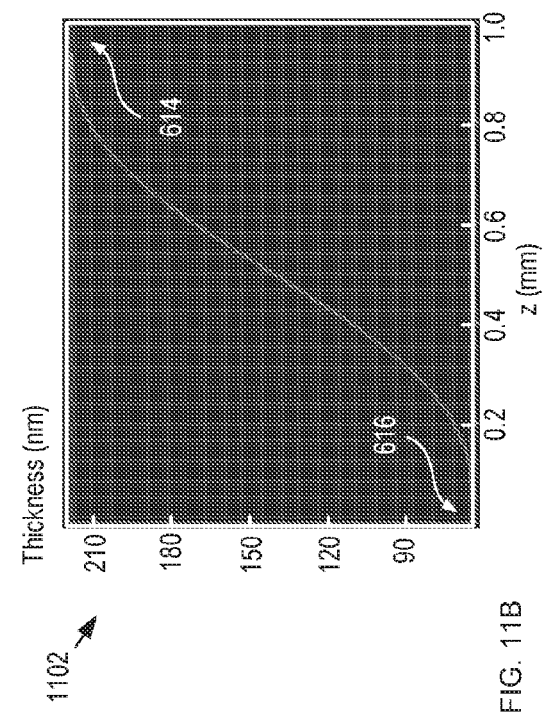
FIGS. 11A-B depict plots of the thickness of exemplary core layers 610 as a function of distance, z, for taper regions having lengths of 2 mm and 1 mm, respectively.
Figure 11A:
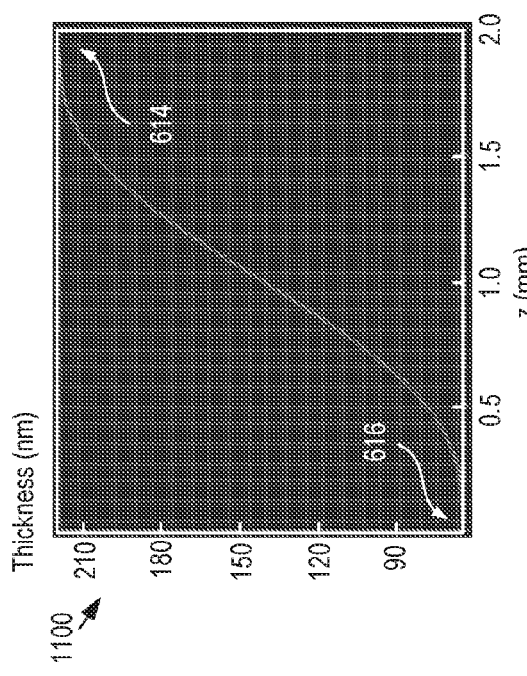

FIGS. 11A-B depict plots of the thickness of exemplary core layers 610 as a function of distance, z, for taper regions having lengths of 2 mm and 1 mm, respectively. Plots 1100 and 1102 show the thickness of core layer 610 from second end 616 to first end 614, for a core layer having an initial thickness, h3, of 220 nm and a final thickness, h4, in low-contrast region 602 of approximately 65 nm.

Figure 11C:
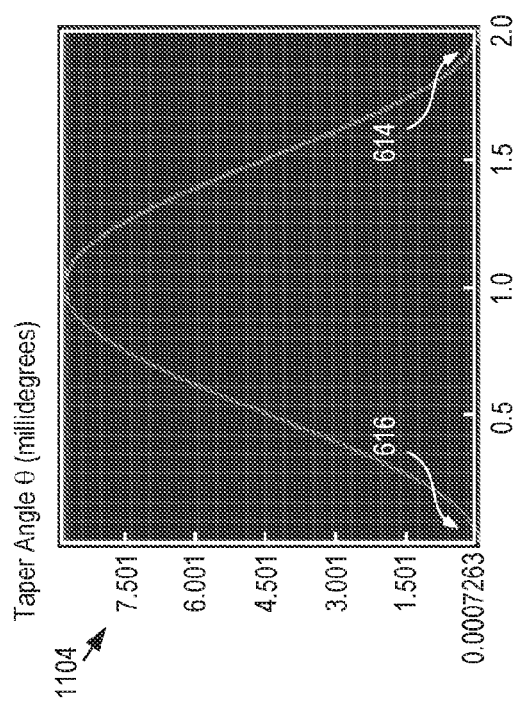
FIGS. 11C-D depict plots of the taper angle, θ, of exemplary core layers 610 as a function of distance, z, for taper regions having lengths of 2 mm and 1 mm, respectively.
Figure 11D:
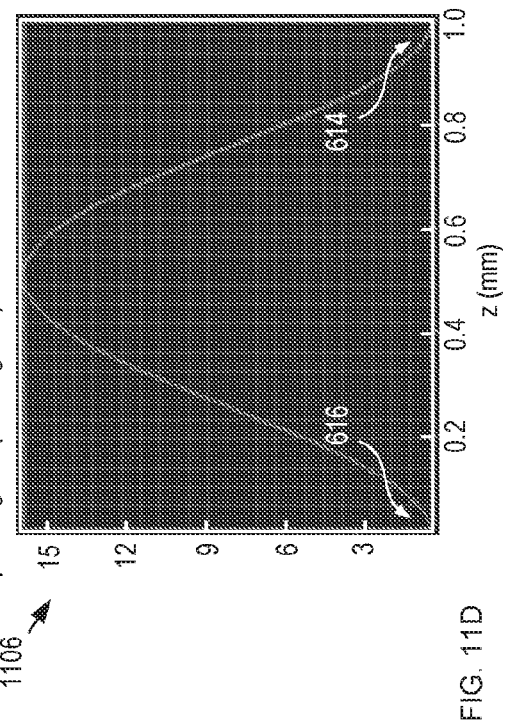

FIGS. 11C-D depict plots of the taper angle, θ, of exemplary core layers 610 as a function of distance, z, for taper regions having lengths of 2 mm and 1 mm, respectively. Plots 1104 and 1106 show the instantaneous angle of the top surface of core layer 610 from second end 616 to first end 614, for a core layer having an initial thickness, h3, of 220 nm and a final thickness, h4, in low-contrast region 602 of approximately 65 nm.

At operation 706, accelerator layer 802 and mask layer 804 are stripped from nascent spotsize converter 600.

At operation 707, core layer 610 is patterned to define core 618. In high-contrast region 606, core 618 has width w1, which is within the range of a few nanometers to a few tens of microns and typically about 1 micron. In low-contrast region 602, core 618 has width w2, which is also within the range of a few nanometers to a few tens of microns. In the illustrative embodiment, w1 is approximately 1 micron and w2 is approximately 65 nm. In transition region 604, the width of core 618 is a function of z. In some embodiments, the width function w(z) is determined in analogous fashion to that described above and with respect to FIG. 9. Typically, w(z) changes monotonically along transition region 604. In the illustrative embodiment, wherein transition region 604 has a thickness that approximates a sine-bend shape, w(z) is defined as:

$$w(z) = \frac{O_{sine}}{L_{sine}}z - \frac{O_{sine}}{2\pi}\sin\left(\frac{2\pi}{L_{sine}}z\right), \quad (5)$$

where $L_{sine}$ is the length, L2, of transition region 604 along the z-direction, and $O_{sine}$=(w1−w2)/2.

It will be clear to one skilled in the art, after reading this Specification, how to define a suitable function, w(z), based on the application for which spotsize converter 600 is intended. In some embodiments, core 618 has the same width in all of regions 602, 604, and 606.

In some embodiments, core 618 comprises a composite core having an inner core of a first material (e.g., silicon dioxide) surrounded by an outer core of a second material (e.g., silicon nitride). In some embodiments, core 618 comprises a composite core having a central core of a first material (e.g., silicon dioxide) that is disposed between lower and upper core layers comprising a second material (e.g., silicon nitride). A composite core is characterized by an effective refractive index that is determined by the materials used as well as the geometry of the core design. As a result, these factors also affect the effective refractive-index contrast of a composite-core waveguide, which is also affected by other factors, such as core and cladding dimensions, core and cladding materials, and the like.

In some embodiments, the transition region wherein the lateral dimension of core 618 changes is not aligned along the z-direction with the transition region wherein the thickness of core 618 changes. In other words, in some embodiments, spotsize converter 600 includes two separate transition regions—one for the thickness of core 618 and another for the lateral dimension of core 618.

At operation 708, upper cladding 612 is formed on core layer 610 in conventional fashion to complete the fabrication of spotsize converter 600. Upper cladding 612 is normally a layer of silicon oxide (e.g., silicon dioxide, silicon monoxide, etc.) formed via LPCVD deposition using a precursor gas such as tetraethyl orthosilicate (TEOS), which results in a conformal oxide layer.

Upper cladding 612 typically has a thickness within the range of approximately 1 micron to approximately 30 microns. In the illustrative embodiment, upper cladding has a thickness of approximately 15 microns. In some embodiments, upper cladding 612 has a thickness that is less than 1 micron. In some embodiments, upper cladding 612 is not present.

Although the illustrative embodiment includes a waveguide having lower and upper cladding layers that have substantially uniform thickness throughout, it will be clear to one skilled in the art, after reading this Specification, how to specify, make, and use alternative embodiments of the present invention wherein at least one of the upper and lower cladding layers is tapered in similar fashion to the manner in which core layer 610 is tapered, as described above, such that one or both of these cladding layers has a thickness and/or width that changes along the propagation direction in at least a portion of a waveguide.

Figure 12B:
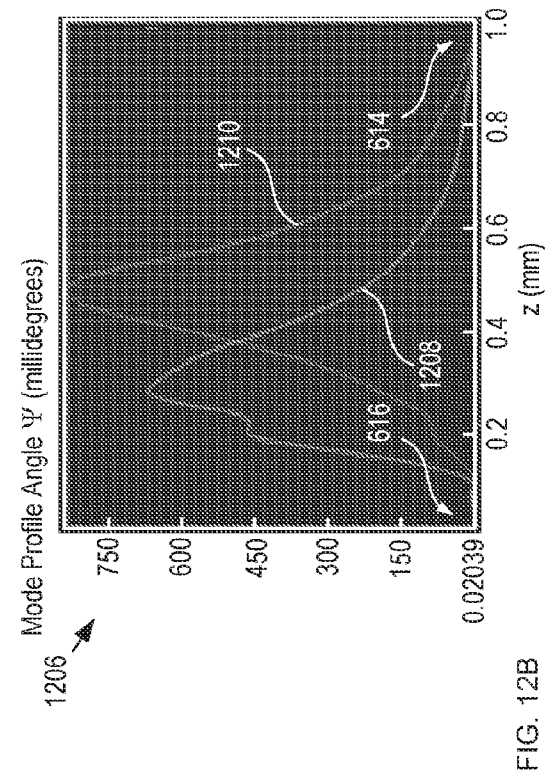
FIGS. 12A and 12B depict plots of a mode profile induced by exemplary sinusoidal taper regions having lengths of approximately 2 mm and 1 mm, respectively.
Figure 12A:
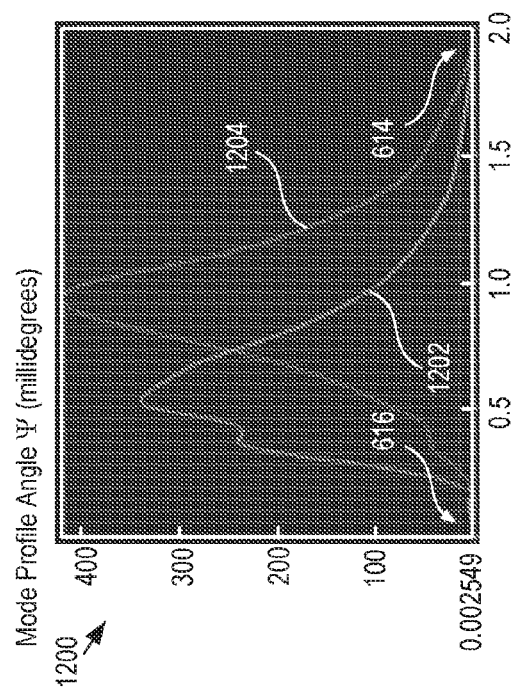

FIGS. 12A and 12B depict plots of a mode profile induced by exemplary sinusoidal taper regions having lengths of approximately 2 mm and 1 mm, respectively.

Plot 1200 shows the mode profile angle, $\Psi$, along transition region 604 from second end 616 to first end 614, where the length of the transition region, L2, is 2 mm. Traces 1202 and 1204 show the mode profile angle for TE and TM polarized light, respectively, at 1550 nm.

Plot 1206 shows the mode profile angle, $\Psi$, along transition region 604 from second end 616 to first end 614, where the length of the transition region, L2, is 1 mm. Traces 1208 and 1210 show the mode profile angle for TE and TM polarized light, respectively, at 1550 nm.

Although the illustrative embodiment comprises a spotsize converter having a transition region including a core layer having a sinusoidal thickness profile, it will be clear to one skilled in the art, after reading this Specification, how to specify, make, and use spotsize converters that include a core layer having any suitable substantially changing vertical profile, including linear, piecewise linear, non-linear, curved, irregular, monotonically changing, non-monotonically changing, exponential, and the like.

In some embodiments, core layer 610 is formed such that it has a taper angle that changes in substantially constant fashion along transition region 604 (neglecting changes that might occur in the immediate vicinity of first end 614 or second end 616). Such a thickness profile affords these embodiments with additional advantages, such as the ability to distribute vertical bending loss (induced by peaks in the taper angle) evenly along the length of the transition region.

In some embodiments, core layer 610 is formed as part of a waveguide structure such that the value of the mode-profile-angle, $\Psi$, of the waveguide remains substantially constant along the length of transition region 604. In some of these embodiments, the thickness of core layer 610 increases substantially exponentially along the length of transition region 604.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A planar-lightwave circuit (PLC) including a first surface waveguide, the first surface waveguide comprising:
   a first cladding layer comprising a first material characterized by a first refractive index;
   a second cladding layer comprising a second material characterized by a second refractive index; and
   a first layer comprising a third material characterized by a third refractive index that is greater than each of the first and second refractive indices, the first layer being between the first and second cladding layers, and the first layer having a first region, second region, and third region that is between the first region and second region, wherein the third region abuts the first region at a first point along a first axis, and wherein the third region abuts the second region at a second point along the first axis;
   wherein the first layer has a first thickness in the first region, a second thickness in the second region, and a third thickness in the third region that changes between the first thickness at the first point and the second thickness at the second point according to a substantially sinusoidal function of position, z, along the first axis; and
   wherein the first surface waveguide has a first mode-field profile in the first region, a second mode-field profile in the second region, and a third mode-field profile, MFD (h(z)), that changes between the first mode-field profile and second mode-field profile between the first point and the second point, MFD(h(z)) being characterized by a substantially sinusoidal function of position, z, along the first axis.

2. The PLC of claim 1 wherein the third thickness changes in substantially sinusoidal fashion along the first axis between the first point and the second point.

3. The PLC of claim 1 wherein the first surface waveguide has a first width in the first region, a second width in the second region, and a third width in the third region that changes monotonically along the first axis from the first point to the second point.

4. The PLC of claim 1 wherein the third thickness along the first axis between the first point and second point is characterized by one half period of a sinusoidal function.

5. The PLC of claim 1 wherein the first layer is characterized by a taper-angle at each point along the first axis between the first point and second point, and wherein the taper angle increases at a constant rate along the first axis from the first point to the second point.

6. The PLC of claim 3 wherein the third width changes non-linearly along the first axis from the first point to the second point.

7. A planar-lightwave circuit (PLC) that includes a first surface waveguide, the first surface waveguide comprising a core, wherein first surface waveguide comprises:
- a first region in which the core has a first thickness, wherein, in the first region, the first surface waveguide is characterized by a first refractive-index contrast that is based on the first thickness;
- a second region in which the core has a second thickness, wherein, in the second region, the first surface waveguide is characterized by a second refractive-index contrast that is based on the second thickness; and
- a third region that is between the first region and the second region and abuts the first region at a first point along a first axis and abuts the second region at a second point along the first axis, wherein the surface waveguide has a third refractive-index contrast that is based on a third thickness of the core, wherein the third refractive-index contrast changes between the first refractive-index contrast and the second refractive-index contrast according to a substantially sinusoidal function of position between the first point and the second point.

8. The PLC of claim 7 wherein the first surface waveguide includes a core layer comprising a first material, the core layer having the first thickness in the first region, the second thickness in the second region, and a third thickness in the third region that changes continuously and non-linearly between the first thickness at the first point and the second thickness at the second point according to a sinusoidal function of position, z, along the first axis.

9. The PLC of claim 8 wherein the third thickness is characterized by one half period of a sinusoidal function.

10. The PLC of claim 8 wherein the first layer is characterized by a taper-angle at each point along a first axis between the first point and second point, and wherein the taper angle changes according to a substantially sinusoidal function of position along the first axis from the first point to the second point.

11. A planar-lightwave circuit (PLC) including a first surface waveguide, the first surface waveguide comprising:
- a first cladding layer comprising a first material characterized by a first refractive index;
- a second cladding layer comprising a second material characterized by a second refractive index; and
- a first layer comprising a third material characterized by a third refractive index that is greater than each of the first and second refractive indices, the first layer being between the first and second cladding layers, and the first layer having a first region, second region, and third region that is between the first region and second region, wherein the third region abuts the first region at a first point along a first axis, and wherein the third region abuts the second region at a second point along the first axis;
- wherein the first layer has a first thickness in the first region, a second thickness in the second region, and a third thickness in the third region that changes between the first thickness and the second thickness along the first axis between the first point and the second point according to a substantially sinusoidal function of position along the first axis.

12. The PLC of claim 11 wherein the first surface waveguide has a first mode-field profile in the first region, a second mode-field profile in the second region, and a third mode-field profile, MFD(h(z)), that changes continuously and non-linearly between the first mode-field profile and second mode-field profile between the first point and the second point, MFD(h(z)) being characterized by a substantially sinusoidal function of position, z, along the first axis.

13. The PLC of claim 12 wherein the third thickness is characterized by one half period of a sinusoidal function.

14. The PLC of claim 11 wherein the first layer is characterized by a taper-angle at each point along a first axis between the first point and second point, and wherein the taper angle increases at a constant rate along the first axis from the first point to the second point.

15. The PLC of claim 11 wherein the first surface waveguide has a third refractive-index contrast that changes between the first refractive-index contrast and the second refractive-index contrast according to a substantially sinusoidal function of position between the first point and the second point.

* * * * *